(12) United States Patent
Patterson

(10) Patent No.: US 10,505,315 B1
(45) Date of Patent: Dec. 10, 2019

(54) APPARATUS FOR MAINTAINING ELECTRICAL CONNECTIVITY IN TRAILER LIGHTS

(71) Applicant: Robert Blair Patterson, Bowling Green, KY (US)

(72) Inventor: Robert Blair Patterson, Bowling Green, KY (US)

( * ) Notice: Subject to any disclaimer, the term of this patent is extended or adjusted under 35 U.S.C. 154(b) by 0 days.

(21) Appl. No.: 16/235,554

(22) Filed: Dec. 28, 2018

Related U.S. Application Data

(60) Provisional application No. 62/623,064, filed on Jan. 29, 2018.

(51) Int. Cl.
*H01R 13/639* (2006.01)
*B60D 1/64* (2006.01)

(52) U.S. Cl.
CPC ............. *H01R 13/639* (2013.01); *B60D 1/64* (2013.01)

(58) Field of Classification Search
CPC ....... E06B 1/6069; B60D 1/64; H01R 13/639; H01R 13/62; H01R 43/20; H01R 43/26
See application file for complete search history.

(56) References Cited

U.S. PATENT DOCUMENTS

| | | | | |
|---|---|---|---|---|
| 2,222,145 A * | 11/1940 | James | ................... | A43D 95/28 72/342.1 |
| 2,772,596 A * | 12/1956 | Trussell | ................. | B62D 17/00 188/196 M |
| 4,948,317 A * | 8/1990 | Marinaro | ................ | F16B 43/00 220/3.7 |
| 5,640,813 A * | 6/1997 | Glazik | .................. | E06B 1/6069 248/188.2 |
| D385,323 S * | 10/1997 | Horton | ......................... | D21/793 |
| 6,368,134 B2 * | 4/2002 | Richter | ................ | H01R 13/622 439/312 |
| 6,382,656 B1 * | 5/2002 | Johnson, Jr. | ............. | B60D 1/06 280/506 |
| 6,560,934 B1 * | 5/2003 | Workman | ............. | E06B 1/6069 248/188.2 |
| D563,202 S * | 3/2008 | Scherer | .......................... | D8/349 |
| 7,589,279 B2 * | 9/2009 | Haynes | .................... | H02G 3/14 174/53 |
| 7,716,880 B1 * | 5/2010 | Shray | .................... | B29C 44/583 248/188.2 |
| D654,093 S * | 2/2012 | Pelini | ............................. | D15/5 |
| D712,726 S * | 9/2014 | Perrin | .......................... | D8/374 |
| 9,065,203 B2 * | 6/2015 | Davies | ................... | H01R 13/62 |
| 9,914,032 B2 * | 3/2018 | Simpson | ................ | A63B 57/50 |
| 2012/0094516 A1 * | 4/2012 | Yang | .................... | H01R 13/533 439/162 |

* cited by examiner

*Primary Examiner* — Briggitte R. Hammond
(74) *Attorney, Agent, or Firm* — Suiter Swantz pc llo

(57) ABSTRACT

A tool to maintain an electrical connector plug in an electrical connector outlet has a variable cross-sectional thickness. The tool is inserted into a gap between the plug and outlet to create lateral displacement of the plug to a force between the plug and the outlet to retain the plug within the outlet via increased friction, and also enhance electrical connectivity of the internal electrical pins. The tool may also include surface texturing to further increase friction, and to hold the tool firmly in place. The tool may also include a rubberized coating to further increase friction and to dampen vibrations that would otherwise serve to dislodge the plug.

20 Claims, 5 Drawing Sheets

APPARATUS FOR MAINTAINING ELECTRICAL CONNECTIVITY IN TRAILER LIGHTS

PRIORITY

The present application claims the benefit under 35 U.S.C. § 119(e) of U.S. Provisional App. No. 62/623,064 (filed Jan. 29, 2018), which is incorporated herein by reference.

FIELD OF THE INVENTION

Embodiments of the inventive concepts disclosed herein are directed generally toward a device to maintain electrical connectivity in trailers.

BACKGROUND

Vehicles that use round electrical connectors for trailer lighting lose connectivity due to extended durations of heavy vibration and environmental conditions, causing an open circuit. The open circuit may cause trailer lights to flicker and flash, creating potentially hazardous confusion among surrounding drivers. Repeated use of such electrical connectors tends to degrade the connection over time, further exacerbating the problem. Furthermore, an open circuit, even in low voltage circuits, can create a fire hazard under certain conditions.

Existing solutions include inserting detritus such as paper, cardboard, pieces of wood, paper clips, etc., around the electrical connector plug to force the electrical pins to connect. Such solutions only work temporarily and, in some cases, increase the fire hazard.

Alternatively, dedicated tools that try to fix this problem are one-size-fixes-all filler pieces that essentially increase the diameter of the electrical connector plug. However, not all trailers are the same and the gap between the electrical connector plug and the interior surface of the electrical connector outlet on the trailer are not all the same. Furthermore, when such filler pieces are properly sized, they only retain the electrical connector plug in the electrical connector outlet; they do not bias the electrical connector plug to enhance electrical connectivity of the internal electrical pins.

SUMMARY

In one aspect, embodiments of the inventive concepts disclosed herein are directed to a tool having a variable cross-sectional thickness. The tool may be inserted into a gap between an electrical connector plug and a corresponding electrical connector outlet on a trailer. The tool creates lateral displacement of the electrical connector plug to enhance electrical connectivity of the internal electrical pins, and also apply a force between the electrical connector plug and the electrical connector outlet to retain the electrical connector plug within the electrical connector outlet via increased friction.

In a further aspect, the tool may include surface texturing to further increase friction to retain the electrical connector plug within the electrical connector outlet, and to hold the tool firmly in place.

In a further aspect, the tool may include a rubberized coating to further increase friction and to dampen vibrations that would otherwise serve to dislodge the electrical connector plug.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
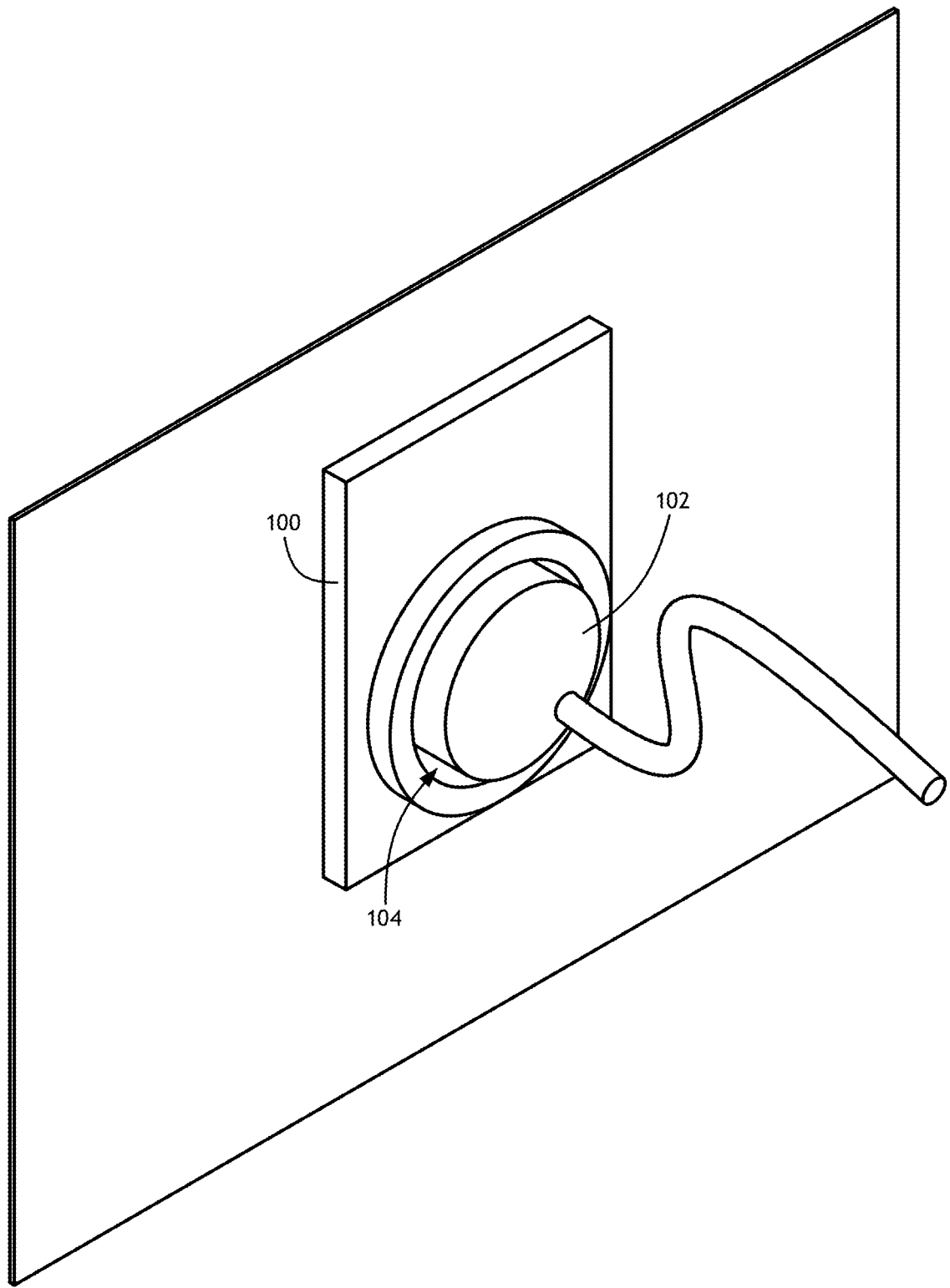
FIG. 1 shows an environmental view of an electrical connector plug and electrical connector outlet where embodiments of the inventive concepts disclosed herein may be used.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a tool for insertion into a gap defined by an electrical connector plug and electrical connector outlet disposed on a trailer to apply a force between the electrical connector plug and electrical connector outlet and hold the electrical connector plug in place.

Figure 2:
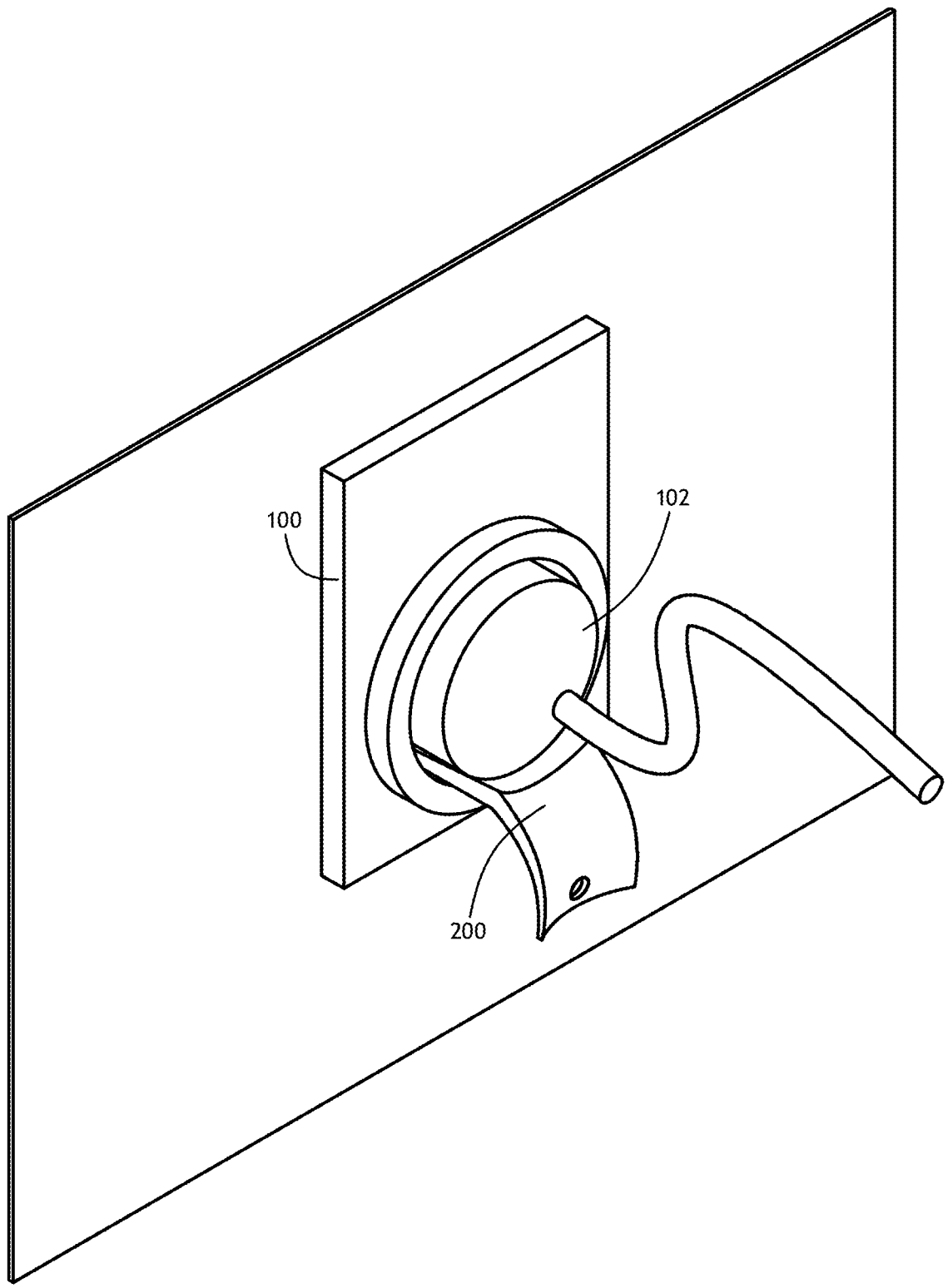
FIG. 2 shows an environmental view of an exemplary embodiment of the inventive concepts disclosed herein within a gap between an electrical connector plug and electrical connector outlet.

Referring to FIGS. 1 and 2, environmental views of an exemplary embodiment of the inventive concepts disclosed herein within a gap between an electrical connector plug and electrical connector outlet are shown. In at least one embodiment, an electrical connector outlet 100 and electrical connector plug 102 are employed to create an electrical connection for trailer lights, such as a commercial tractor-trailer (semi-trailer), consumer boat trailer, etc. The engaged electrical connector outlet 100 and electrical connector plug 102 may define a small gap 104. In some circumstances, the gap 104 represents a designed tolerance to allow easy engagement and disengagement of the electrical connector outlet 100 and electrical connector plug 102 in an external environment where the surfaces of the electrical connector outlet 100 and electrical connector plug 102 may be fouled. However, such gap 104 also allows the electrical connector plug 102 to move within the electrical connector outlet 100, potentially shacking loose and compromising electrical connectivity to the corresponding lighting system.

In at least one embodiment, the plug securing tool 200 may be inserted in any portion of the gap 104 as necessary to produce the desired connectivity. Different electrical connector outlets 100 and electrical connector plugs 102 may be better suited to different insertion points along the circumference of the electrical connector plug 102.

In at least one embodiment, a plug securing tool 200 is inserted into the gap 104. The increasing cross-sectional thickness of the plug securing tool 200 forces a small lateral displacement of the electrical connector plug 102. The lateral displacement may increase electrical connectivity of the internal electrical pins (obscured), and induce physical contact between the electrical connector outlet 100 and electrical connector plug 102 such that friction will tend to retain the electrical connector plug 102 in the electrical connector outlet 100.

Figure 3:
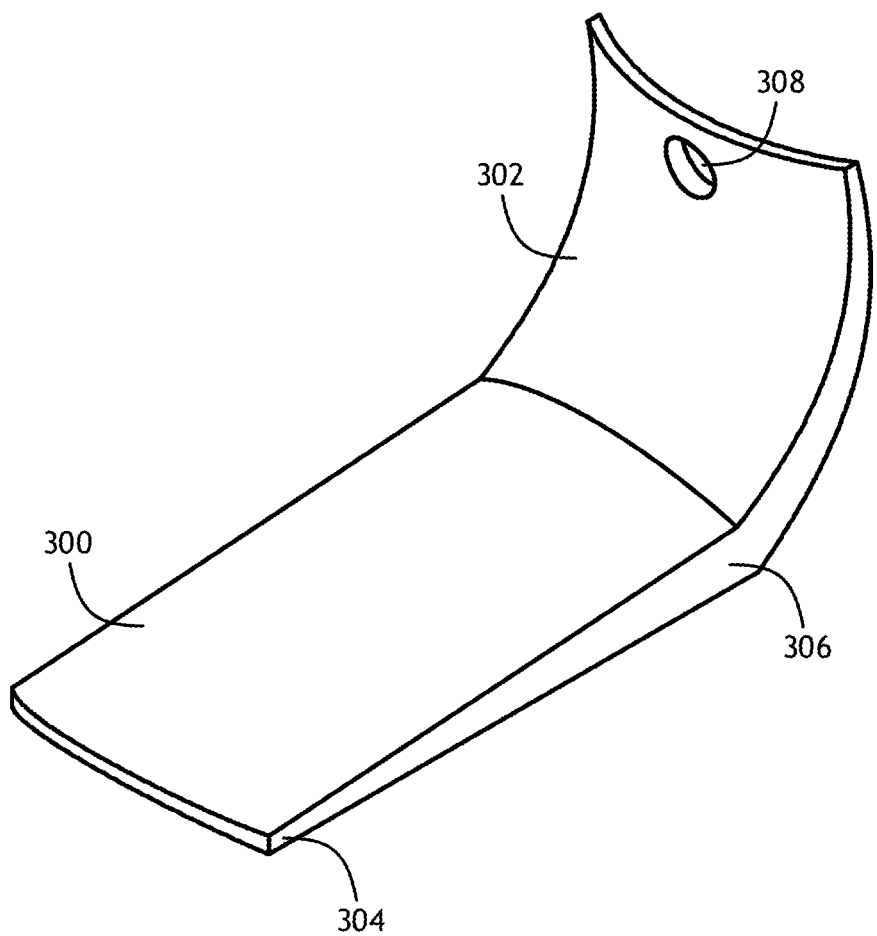
FIG. 3 shows a perspective view of an exemplary embodiment of the inventive concepts disclosed herein.

Referring to FIG. 3, a perspective view of an exemplary embodiment of the inventive concepts disclosed herein is shown. A plug securing tool includes a wedge body 300 and a handle 302. The wedge body 300 defines a distal portion 304 configured to be inserted into a gap between an electrical connector pug and an electrical connector outlet, and a proximal portion 306. The handle 302 is disposed on the proximal portion 306 and allows a user to push the plug securing tool into the gap along an axis defined by the distal portion 304 and proximal portion 306.

In at least one embodiment, the wedge body 300 defines an increasing thickness from the distal portion 304 to the proximal portion 306.

In at least one embodiment, the handle 302 defines a lanyard hole 308. A lanyard may be used to secure the plug securing tool to a corresponding electrical connector plug.

In at least one embodiment, the handle 302 is curved. A curved handle 302 is more ergonomic to allow the user to more easily apply the force necessary to push the wedge body 300 into the corresponding gap. Furthermore, a curved handle 302 creates a degree of clearance to avoid a protruding lip of a corresponding electrical connector outlet.

In at least one embodiment, the wedge body 300 and handle 302 may comprise plastic such as polylactide (PLA), acrylonitrile butadiene styrene (ABS), Nylon, polyethylene terephthalate (PET), polyoxymethylene (POM), or other material suitable for the environment contact with components of an electrical connection.

Figure 4:
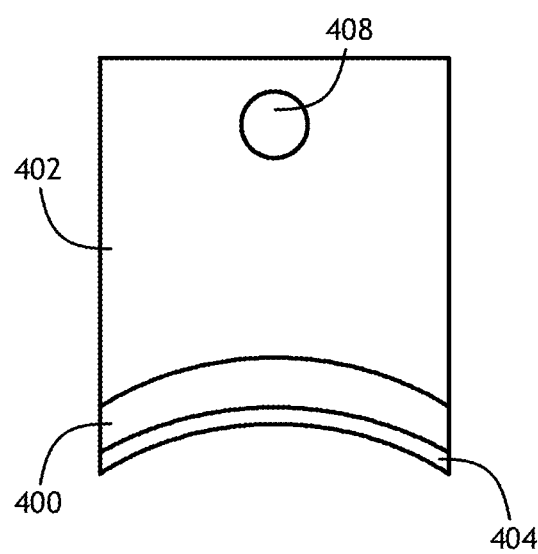
FIG. 4 shows a front view of an exemplary embodiment of the inventive concepts disclosed herein.
Figure 5:
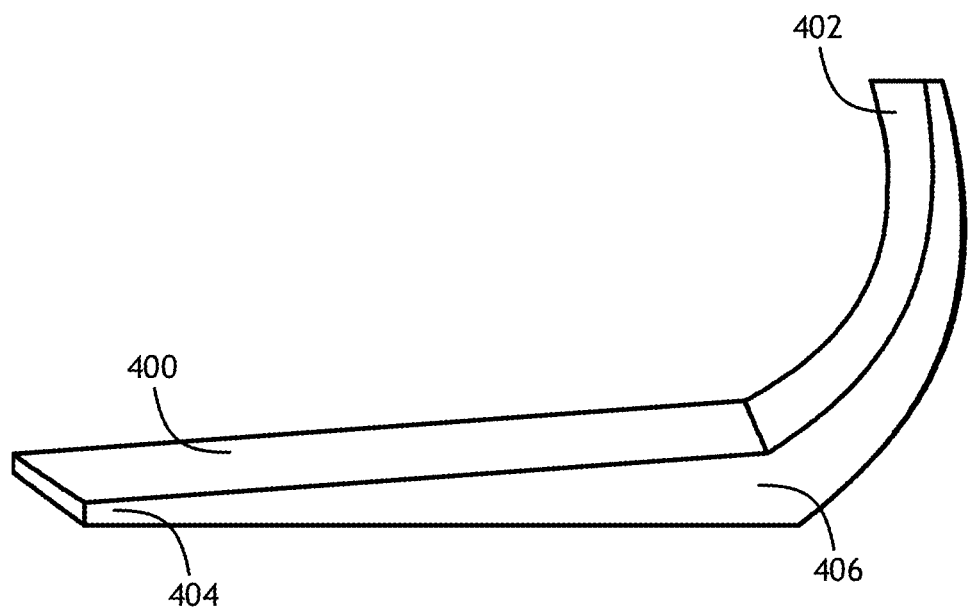
FIG. 5 shows a side view of an exemplary embodiment of the inventive concepts disclosed herein.

Referring to FIGS. 4 and 5, a front view and side of an exemplary embodiment of the inventive concepts disclosed herein are shown. Where a plug securing tool comprises a wedge body 400 with a distal end 404 and a proximal end 406, and a handle 402 that defines a lanyard hole 408, the wedge body 400 may be curved to generally accommodate a rounded shape of an electrical connector outlet and electrical connector plug. In at least one embodiment, the curvature of the wedge body 400 may define a substantially constant radius. In another embodiment, curvature of the wedge body 400 may define a variable or increasing radius along an axis from the distal portion 404 to a proximal portion 406.

In at least one embodiment, the width of the wedge body 400 may be approximately twenty-one millimeters, the height of the plug securing tool at the handle 402 may be approximately twenty-five millimeters, and the length of the plug securing tool may be approximately fifty-one millimeters.

Figure 6:
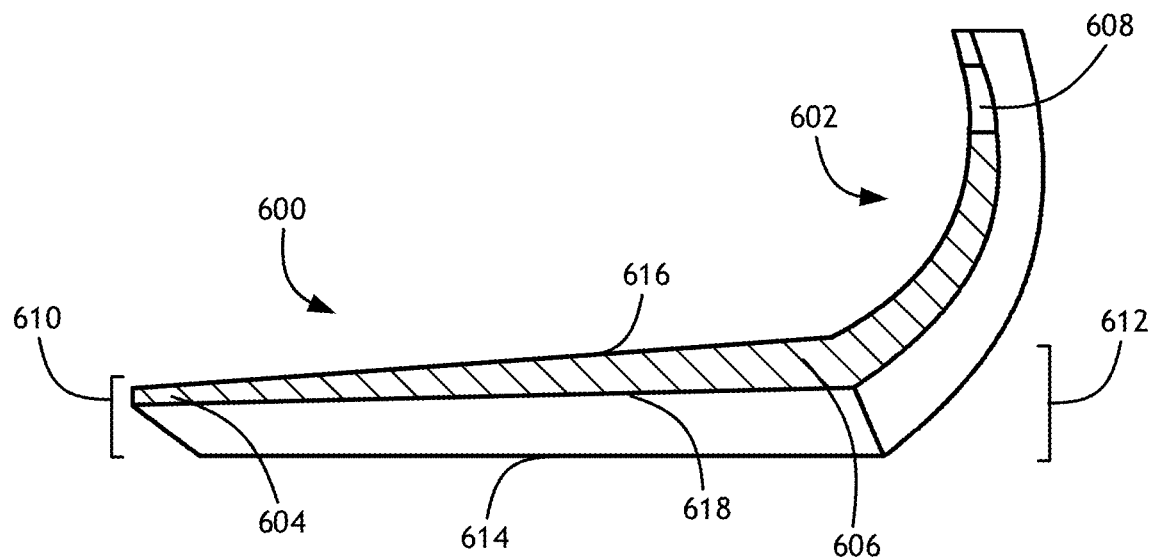
FIG. 6 shows a side sectional view of an exemplary embodiment of the inventive concepts disclosed herein.

Referring to FIG. 6, a side sectional view of an exemplary embodiment of the inventive concepts disclosed herein is shown. Where a plug securing tool comprises a wedge body 600 with a distal end 604 and a proximal end 606, and a handle 602 that defines a lanyard hole 608, the wedge body 600 may define both an increasing overall height and an increasing cross-sectional thickness.

In at least one embodiment, the distal portion 604 may define a first overall height 610 (as measured from a bottom surface 614 to the top of an outlet abutting surface 616) and the proximal portion 606 may define a second overall height 612. For example, the first overall height 610 may be approximately four millimeters while the second overall height 612 may be approximately seven millimeters.

Furthermore, in at least one embodiment, the distal portion 604 may define a first cross-sectional thickness (as measured from an outlet abutting surface 616 to a plug abutting surface 618) and the proximal portion 606 may define a second cross-sectional thickness. For example, the first cross-sectional thickness may be approximately one millimeter while the second cross-sectional thickness may be approximately three and one-half millimeters.

In at least one embodiment, the distal portion 604 may be curved along the width of the wedge body 600, or otherwise truncated at the edges such that the very distal tip of the distal portion 604 defines a minimal thickness to facilitate insertion of the distal portion 604 into a gap as described herein.

The increasing overall height 610, 612 and increasing cross-sectional thickness work to apply a force between a corresponding electrical connector outlet and electrical connector plug to secure the plug in-place and increase electrical connectivity of the corresponding internal electrical pins.

Figure 7:
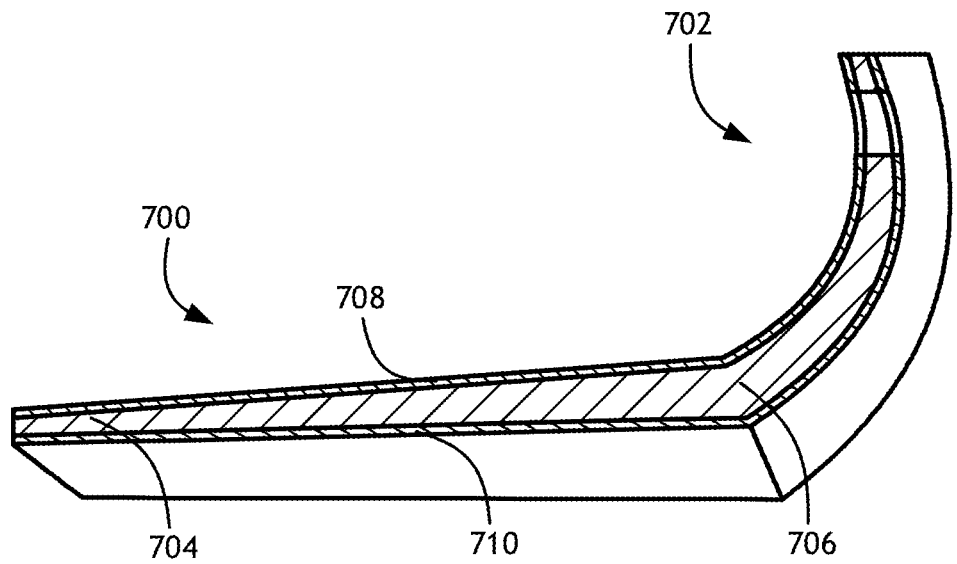
FIG. 7 shows a side sectional view of an exemplary embodiment of the inventive concepts disclosed herein.

Referring to FIG. 7, a side sectional view of an exemplary embodiment of the inventive concepts disclosed herein is shown. Where a plug securing tool comprises a wedge body 700 with a distal end 704 and a proximal end 706, and a handle 702, a friction enhancing material 708, 710 may be disposed on the wedge body 700.

In at least one embodiment, the wedge body 700 and handle 702 may comprise a relatively smooth and/or rigid material. In such embodiments, a rubberized or friction enhancing material 708, 710 may be disposed on the top or bottom surface of the wedge body, or both. A rubberized layer may insulate the plug securing tool from any electrical contact, and dampen vibrations that might otherwise tend to dislodge the plug securing tool over time.

Figure 8:
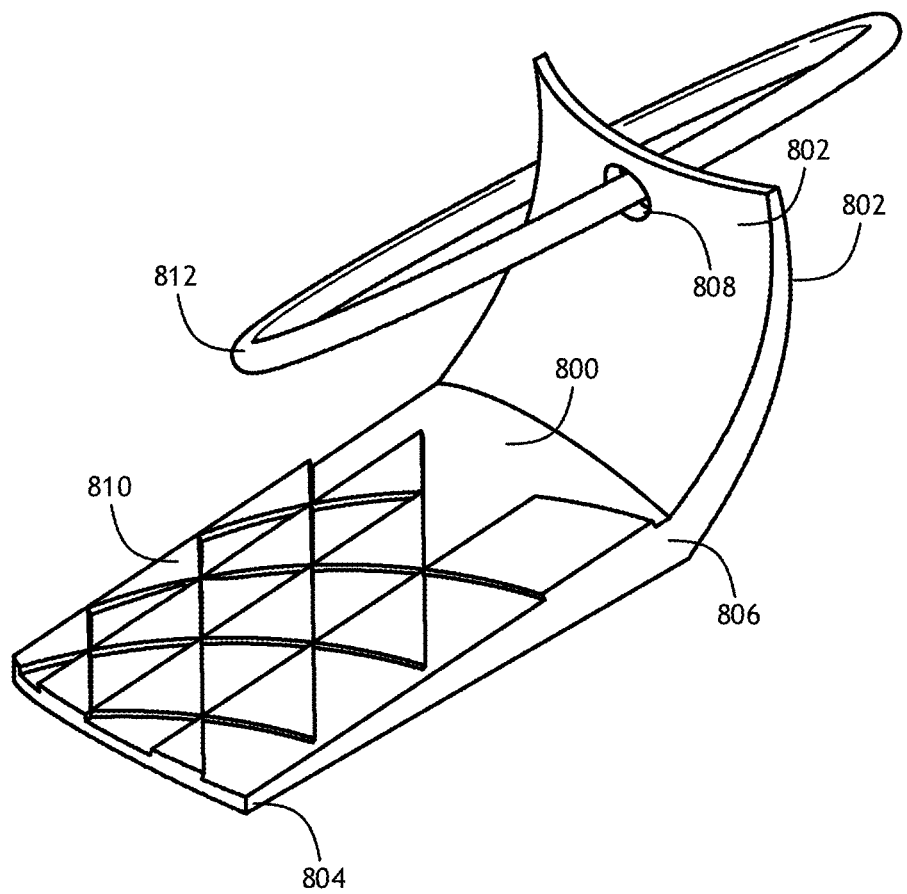
FIG. 8 shows a perspective view of an exemplary embodiment of the inventive concepts disclosed herein.

Referring to FIG. 8, a perspective view of an exemplary embodiment of the inventive concepts disclosed herein is shown. Where a plug securing tool comprises a wedge body 800 with a distal end 804 and a proximal end 806, and a handle 802 that defines a lanyard hole 808, the wedge body 800 may include a plurality of texturing features 810 disposed on a top or bottom surface of the wedge body 800, or both. Texturing features may enhance friction created between the wedge body 800 and the corresponding electrical connector plug and electrical connector outlet.

In at least one embodiment, a lanyard 812 may secure the plug securing tool to a corresponding electrical connector plug. The lanyard 812 may comprise 550 Paracord or other type of cord or string suitable for exterior applications.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An apparatus for maintaining electrical connectivity between an electrical connector plug and an electrical connector outlet, said apparatus comprising:

a wedge body having a distal portion and a proximal portion, the distal portion configured for insertion between the electrical connector plug and the electrical connector outlet; and a handle disposed on the proximal portion, wherein:

the wedge body defines at least one radius of curvature; and the wedge body defines an increasing cross-sectional thickness from the distal portion to the proximal portion to create a lateral displacement of the electrical connector plug to increase electrical connectivity of the electrical connector plug and the electrical connector outlet.

2. The apparatus of claim 1, wherein the handle defines a lanyard hole.

3. The apparatus of claim 1, wherein the wedge body defines an increasing radius of curvature from the distal portion to the proximal portion.

4. The apparatus of claim 1, wherein the wedge body defines an increasing overall height from the distal portion to the proximal portion, separate from the increasing cross-sectional thickness.

5. The apparatus of claim 1, further comprising one or more texturing elements disposed on at least one surface of the wedge body.

6. The apparatus of claim 1, further comprising at least one rubberized layer disposed on at least one surface of the wedge body.

7. The apparatus of claim 1, wherein at least one corner of the wedge body is truncated at the distal portion.

8. An apparatus for maintaining electrical connectivity in a trailer light system, said apparatus comprising:

a wedge body having a distal portion and a proximal portion, the distal portion configured for insertion between the electrical connector plug and the electrical connector outlet; and a handle disposed on the proximal portion, wherein:

the wedge body defines at least one radius of curvature; and the wedge body defines an increasing cross-sectional thickness from the distal portion to the proximal portion to create a lateral displacement of the electrical connector plug to increase electrical connectivity of the electrical connector plug and the electrical connector outlet.

9. The apparatus of claim 8, wherein the wedge body defines an increasing radius of curvature from the distal portion to the proximal portion.

10. The apparatus of claim 8, wherein the wedge body defines an increasing overall height from the distal portion to the proximal portion, separate from the increasing cross-sectional thickness.

11. The apparatus of claim 8, further comprising one or more texturing elements disposed on at least one surface of the wedge body.

12. The apparatus of claim 8, further comprising at least one rubberized layer disposed on at least one surface of the wedge body.

13. The apparatus of claim 8, wherein at least one corner of the wedge body is truncated at the distal portion.

14. A vehicle and trailer system comprising:

an apparatus for maintaining electrical connectivity in the trailer system comprising:

a wedge body having a distal portion and a proximal portion, the distal portion configured for insertion between the electrical connector plug and the electrical connector outlet; and a handle disposed on the proximal portion, wherein:

the wedge body defines at least one radius of curvature; and the wedge body defines an increasing cross-sectional thickness from the distal portion to the proximal portion to create a lateral displacement of the electrical connector plug to increase electrical connectivity of the electrical connector plug and the electrical connector outlet.

15. The system of claim 14, wherein the wedge body defines an increasing radius of curvature from the distal portion to the proximal portion.

16. The system of claim 14, wherein the wedge body defines an increasing overall height from the distal portion to the proximal portion, separate from the increasing cross-sectional thickness.

17. The system of claim 14, further comprising one or more texturing elements disposed on at least one surface of the wedge body.

18. The system of claim 14, further comprising at least one rubberized layer disposed on at least one surface of the wedge body.

19. The system of claim 14, wherein at least one corner of the wedge body is truncated at the distal portion.

20. The system of claim 14, wherein the handle is curved.

\* \* \* \* \*